United States Patent
Sung

(10) Patent No.: US 7,397,202 B2
(45) Date of Patent: Jul. 8, 2008

(54) BRIGHTNESS CONTROL CIRCUIT AND BACKLIGHT CONTROL MODULE

(75) Inventor: Yung-Chun Sung, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 11/746,672

(22) Filed: May 10, 2007

(65) Prior Publication Data

US 2007/0267977 A1 Nov. 22, 2007

(30) Foreign Application Priority Data

May 16, 2006 (TW) .............................. 95117244 A

(51) Int. Cl.
*H05B 37/00* (2006.01)

(52) U.S. Cl. .................. 315/291; 315/149; 315/157; 315/158; 315/159

(58) Field of Classification Search ................. 315/291, 315/246, 247, 149, 157, 158, 159, 302, 307
See application file for complete search history.

(56) References Cited

U.S. PATENT DOCUMENTS 6,538,394 B2 * 3/2003 Volk et al. .................. 315/291
7,245,090 B2 * 7/2007 Yang .......................... 315/307

* cited by examiner

*Primary Examiner*—David H Vu
(74) *Attorney, Agent, or Firm*—Thomas, Kayden, Horstemeyer & Risley

(57) ABSTRACT

A brightness control circuit is used to control brightness of a light emitting module. A light sensor module generates a first current through itself according to a light intensity. A charging module is coupled between the light sensor module and the ground, and generates a charging voltage at a voltage node according to the first current. A voltage control circuit comprises a reference voltage source, a comparator and a diode. The reference voltage source provides a reference voltage. The comparator has a non-inverse input terminal coupled to the reference voltage source, an inverse input terminal coupled to the voltage node, and an output terminal. The comparator outputs a comparative signal according to the reference voltage and the charging voltage. The diode is coupled between the inverse input terminal and the output terminal. The switch is coupled to the voltage control circuit and provides a second current through the light emitting module according to the comparative signal.

20 Claims, 3 Drawing Sheets

US 7,397,202 B2

BRIGHTNESS CONTROL CIRCUIT AND BACKLIGHT CONTROL MODULE

BACKGROUND OF THE INVENTION

1. Field of the Invention

The invention relates to brightness control, and in particular to a brightness control circuit utilizing pulse width modulation technology.

2. Description of the Related Art

Currently many electronic devices use panels to display information, such as cellphone, digital camera, personal digital assistant (PDA) and global positioning system (GPS). In brighter environments, panels require brighter display that users can easily see the content of the panels. While in darker environments, less brightness is desirable to conserve power. In addition, users will not feel uncomfortable if the panel is adjusted according to the environmental brightness. Since most of the devices mentioned use batteries as main power, in normal conditions, voltage of the batteries gradually decreases with use. Thus, the electronic devices' panels need to operate in a specific voltage range to maintain and provide specific illumination.

FIG. 1 is a schematic diagram of conventional panel brightness control circuit 100. DC/DC converter 10 receives battery power 50 for conversion to a specific voltage, such as 9 volts, provided to constant current controller 20. Constant current controller 20 uses sensor 30 to control current output to photodiode 40, further controlling the brightness of photodiode 40. In a brighter environment, constant current controller 20 provides a stronger current to photodiode 40, providing brighter emission. In darker environments, constant current controller 20 provides a weaker current to photodiode 40, providing darker emission.

Such conventional methods require extra DC/DC converter 10 to provide constant voltage and extra constant current controller 20 to provide the constant current. Thus, the system is more complicated and costly.

In addition, conventional cameras have a light sensor disposed inside the lens, although brightness on the lens side and the panel side (back of lens) are different. The light sensor does not detect actual brightness of the panel side, often causing a problem wherein the panel of the conventional camera is too bright or too dark for a user and wastes excess electrical power.

BRIEF SUMMARY OF THE INVENTION

A detailed description is given in the following embodiments with reference to the accompanying drawings.

An embodiment of a brightness control circuit controlling brightness of a light emitting module is provided. A brightness control circuit comprises a light sensor module, a charging module, a voltage control circuit and a switch. The light sensor module generates a first current through the light sensor module according to a light intensity. The charging module is coupled between the light sensor module and a ground and generates a charging voltage at a voltage node according to the first current. The voltage control circuit comprises a reference voltage source, a comparator and a diode. The reference voltage source provides a reference voltage. The comparator has a non-inverse input terminal coupled to the reference voltage source, an inverse input terminal coupled to the voltage node and a first output terminal and outputs a comparative signal according to the reference voltage and the charging voltage. The diode is coupled between the inverse input terminal and the first output terminal. The switch is coupled to the voltage control circuit and provides a second current through the light emitting module according to the comparative signal.

An embodiment of a brightness control circuit for an electronic device with a light emitting module. A brightness control circuit comprises a light sensor module, a charging module, a voltage control circuit and a bipolar transistor. The light sensor module generates a first current through the light sensor module according to a light intensity. The charging module is coupled between the light sensor module and a ground and generates a charging voltage at a voltage node according to the first current. The voltage control circuit comprises a reference voltage source, an operational amplifier and a diode. The reference voltage source provides a reference voltage. The operational amplifier has a non-inverse input terminal coupled to the reference voltage source, an inverse input terminal coupled to the voltage node and a first output terminal and outputs a comparative signal according to the reference voltage and the charging voltage. The diode is coupled between the inverse input terminal and the first output terminal. The bipolar transistor is coupled to the voltage control circuit and provides a second current according to the comparative signal.

An embodiment of a backlight control module is provided. The backlight control module comprises a light emitting module and a brightness control circuit. The brightness control circuit comprises a light sensor module, a charging module, a voltage control circuit and a switch. The light sensor module generates a first current through the light sensor module according to a light intensity. The charging module is coupled between the light sensor module and a ground and generates a charging voltage at a voltage node according to the first current. The voltage control circuit comprises a reference voltage source, a comparator and a diode. The reference voltage source provides a reference voltage. The comparator has a non-inverse input terminal coupled to the reference voltage source, an inverse input terminal coupled to the voltage node and a first output terminal and outputs a comparative signal according to the reference voltage and the charging voltage. The diode is coupled between the inverse input terminal and the first output terminal. The switch is coupled to the voltage control circuit and provides a second current through an light emitting module according to the comparative signal.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
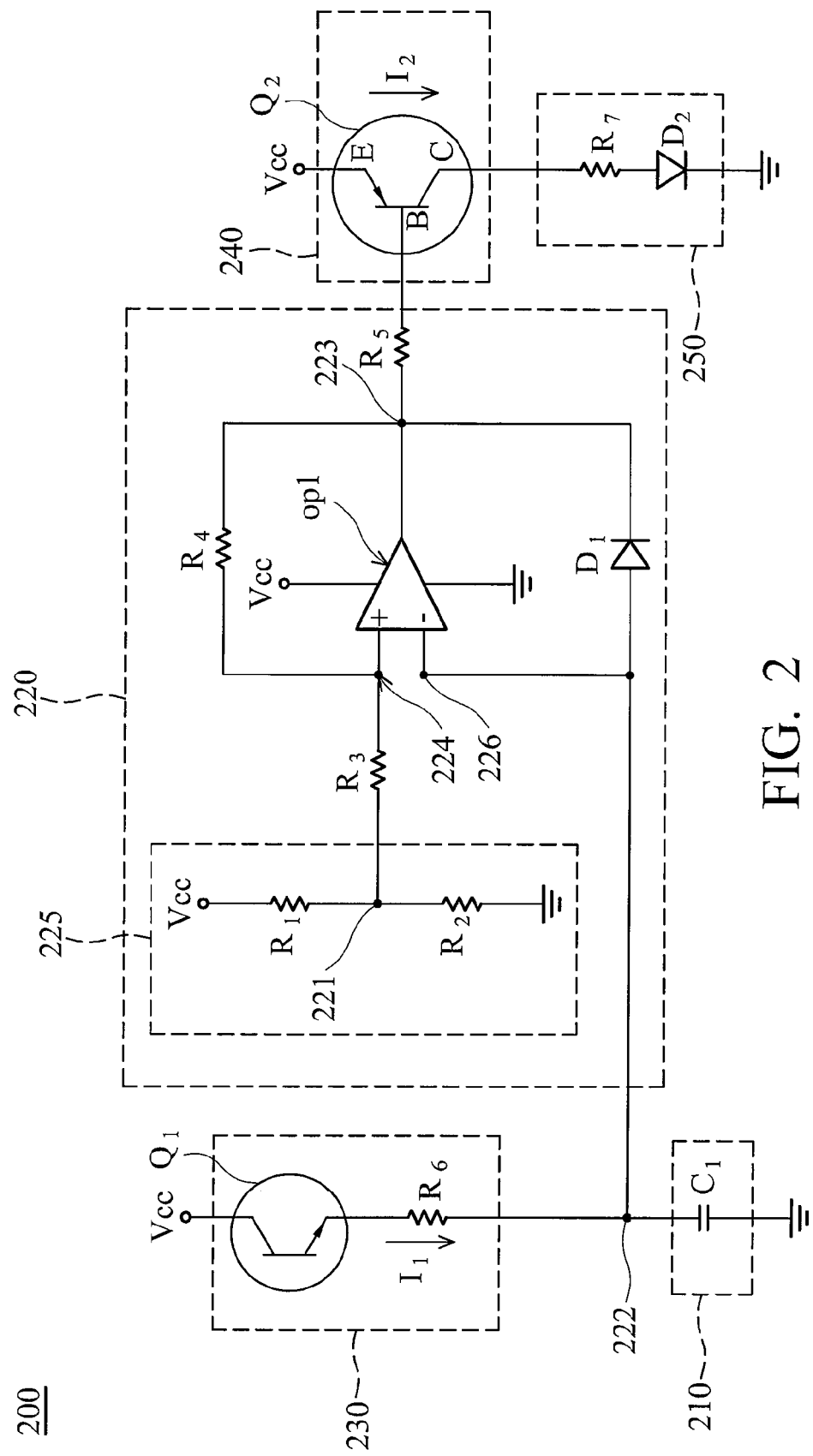
FIG. 2 is a circuit diagram of a brightness control circuit according to an embodiment of the invention.

FIG. 2 is a circuit diagram of brightness control circuit 200 according to an embodiment of the invention. Brightness control circuit 200 comprises voltage control circuit 220, light sensor module 230, charging module 210, switch 240 and light emitting module 250. Light sensor module 230 comprises light sensor $Q_1$ and resistor $R_6$ and is coupled between charging module 210 and voltage Vcc. Light sensor $Q_1$ is coupled between voltage Vcc and resistor R6 and generates corresponding current $I_1$ through light sensor module 230 according to the brightness of the received light. If the received light is strong, light sensor $Q_1$ provides a stronger current. If the received light is weak, light sensor $Q_1$ provides a weaker current. For example, light sensor $Q_1$ can be a photoelectric converting element.

Charging module 210, comprising at least one capacitor $C_1$, is coupled between light sensor module 230 and ground and generates charging voltage Vin on voltage node 222 according to current $I_1$.

Voltage control circuit 220 comprises at least one reference voltage source 225, one operational amplifier $OP_1$, one diode $D_1$ and resistors $R_1$, $R_2$, $R_3$, $R_4$ and $R_5$. Reference voltage source 225 generates reference voltage Vref on node 221. Operational amplifier (comparator) $OP_1$ comprises non-inverse input terminal 224 coupled to reference voltage source 225 and inverse input terminal 226 coupled to voltage node 222. Operational amplifier $OP_1$ also comprises output terminal 223. Operational amplifier $OP_1$ generates output voltage Vout at output terminal 223 according to voltage V+ of non-inverse input terminal 224 and voltage V− of inverse input terminal 226. When voltage V− of inverse input terminal 226 exceeds voltage V+ of non-inverse input terminal 224, output voltage Vout is low voltage level. On the other hand, when voltage V− of inverse input terminal 226 is weaker than voltage V+ of non-inverse input terminal 224, output voltage Vout is high voltage level. In addition, diode $D_1$ is coupled between inverse input terminal 226 and output terminal 223. Resistor $R_4$ is coupled between non-inverse input terminal 224 and output terminal 223. Resistor $R_5$ is coupled between output terminal 223 and switch 240. Resistor $R_3$ is coupled between non-inverse input terminal 224 and node 221.

Switch 240 is coupled to voltage control circuit 220 and generates current $I_2$ through light emitting module 250 according to output voltage Vout. When output voltage Vout is low voltage level, switch 240 is turned on and provides current $I_2$ to light emitting module 250 so that light emitting module 250 emits light. On the contrary, when output voltage Vout is high voltage level, switch 240 is turned off and does not provide current $I_2$ to light emitting module 250 so that light emitting module 250 does not emit light. Switch 240 comprises bipolar transistor $Q_2$ with emitter E, base B collector C. Emitter E is coupled to voltage Vcc, Base B is coupled to voltage control circuit 220 and Collector C is coupled to light emitting module 250. Light emitting module 250 comprises at least one resistor $R_7$ and one photodiode $D_2$. Resistor $R_7$ is coupled between switch 240 and photodiode $D_2$.

In a brighter environment, light sensor $Q_1$ correspondingly generates a stronger current to charge capacitor $C_1$ and the voltage level of voltage node 222 rises. When voltage Vin− of inverse input terminal of operational amplifier $OP_1$ exceeds voltage Vin+ of non-inverse input terminal of operational amplifier $OP_1$, output voltage Vout changes from high voltage to low voltage level. At the same time, bipolar transistor $Q_2$ is turned on. Turned-on bipolar $Q_2$ generates current $I_2$ through light emitting module 250 and photodiode $D_2$ emits light. On the contrary, in a darker environment, compared to the above brighter environment, light sensor $Q_1$ correspondingly generates a weaker current to charge capacitor $C_1$ slowly and the voltage level of voltage node 222 still rises but more slowly. When voltage Vin− of inverse input terminal of operational amplifier $OP_1$ exceeds voltage Vin+ of non-inverse input terminal of operational amplifier $OP_1$, output voltage Vout changes from high voltage to low voltage level. Bipolar transistor $Q_2$ is turned on. Turned-on bipolar $Q_2$ generates current $I_2$ through light emitting module 250 and photodiode $D_2$ emits light. Thus, comparing between brighter and darker environments, in the darker environment, more time is required for voltage Vin− of the inverse input terminal of operational amplifier $OP_1$ to rise to equal or exceed voltage Vin+ of the non-inverse input terminal of operational amplifier $OP_1$.

When output voltage Vout is low voltage level and the voltage of the positive terminal (voltage node 222) of diode $D_1$ is higher than that of the negative terminal (output terminal 223) of diode $D_1$ a specific voltage value, diode $D_1$ is turned on. Capacitor $C_1$ discharges through diode $D_1$ to output terminal 223 and then the voltage level of voltage node 222 drops. After voltage Vin− of the inverse input terminal is lower than voltage Vin+ of the non-inverse input terminal, output voltage Vout changes from the low voltage level to the high voltage level. Diode $D_1$ is turned off and bipolar transistor $Q_2$ is also turned off so there is no current $I_2$ through photodiode $D_2$. Photodiode $D_2$ becomes dark. Current $I_1$ through light sensor $Q_1$ charges capacitor $C_1$ again, and the voltage level of voltage node 222 rises again. The voltage of voltage node 222 rises or falls according to charging or discharging capacitor $C_1$ to form a triangle wave. As the voltage of voltage node 222 varies, the voltage of output terminal 223 also forms a triangle wave (the environmental brightness and voltage value vary the frequency and width of the triangle wave). Bipolar transistor $Q_2$ switches on or off according to the voltage of voltage node 222. Thus, photodiode $D_2$ emits light at a specific frequency. If the frequency is above 60 Hz, flicker of photodiode $D_2$ cannot be detected. The speed to charge capacitor $C_1$ depends on the environmental brightness. The frequency of turned on and turned off of bipolar transistor $Q_2$ also depends on the environmental brightness. Thus, the emitting light frequency of photodiode $D_2$ varies according to the environmental brightness. If the environmental brightness is brighter, voltage Vin− of the inverse input terminal of operational amplifier $OP_1$ rises to voltage Vin+ of the non-inverse input terminal of operational amplifier $OP_1$ faster. On the contrary, if the environmental brightness is darker, the emitting light frequency of photodiode $D_2$ is lower to make photodiode $D_2$ darker.

Figure 3:
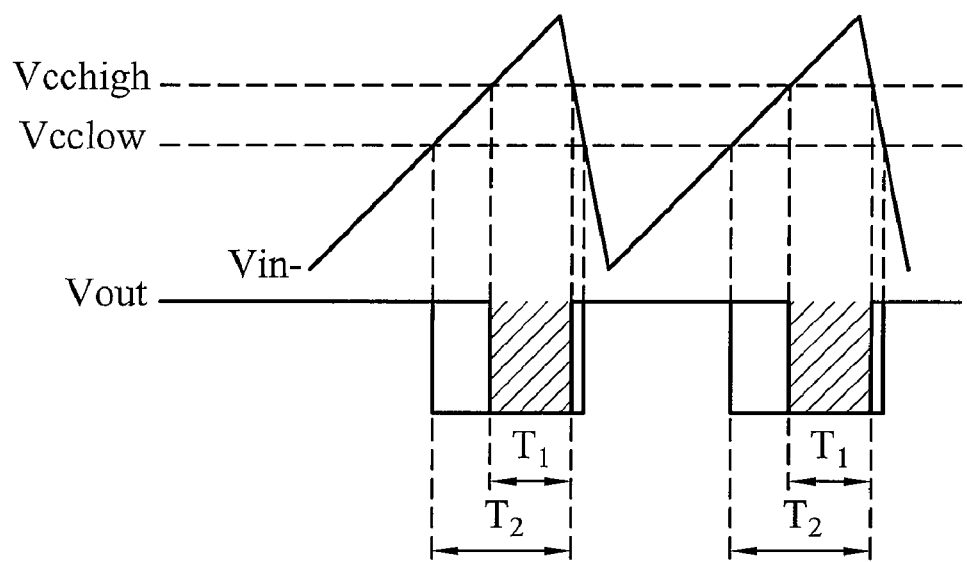
FIG. 3 is a wave diagram of output voltage and inverse input terminal voltage operating in different voltage sources according to another embodiment of the invention.

FIG. 3 is a wave diagram of output voltage Vout and voltage Vin− of inverse input terminal operating in different voltage source according to another embodiment of the invention. Voltage Vin− of inverse input terminal is a triangle wave. Output voltage Vout is a pulse width modulation wave (PWM wave). Brightness control circuit 200 uses output voltage Vout as a PWM wave to control the emitting light time and frequency of photodiode $D_2$. When voltage Vcc is Vcchigh, the period, output voltage Vout being low voltage level, is $T_1$. When voltage Vcc is Vcclow, the period, output voltage Vout being low voltage level, is $T_2$. As shown in FIG. 3, the period $T_2$ corresponding to Vcclow is longer than the period $T_1$ corresponding to Vcchigh. Thus, as the voltage of a voltage source gradually decreases because of power consumption, the turned on time of bipolar transistor $Q_2$ increases gradually. Since the voltage Vcc decreases to reduce brightness of photodiode $D_2$, the time of current $I_2$ through photodiode $D_2$ becomes longer to maintain the total brightness of photodiode $D_2$.

In addition, according to an embodiment of the invention, using the brightness control circuit 200 to control the display brightness, the display can directly use battery power. The display's brightness will not be affected by battery power loss. Without a DC-DC converter, the display can save power about 5% to 10%. Using the operational amplifier and light sensor to control the display's brightness, the display can respond to environmental brightness quickly. The brightness control circuit can also be used in an electronic device with a display. The electronic device can be a LCD TV, a PDA, an image capturing device, a cellphone or a handheld game console.

Figure 1:
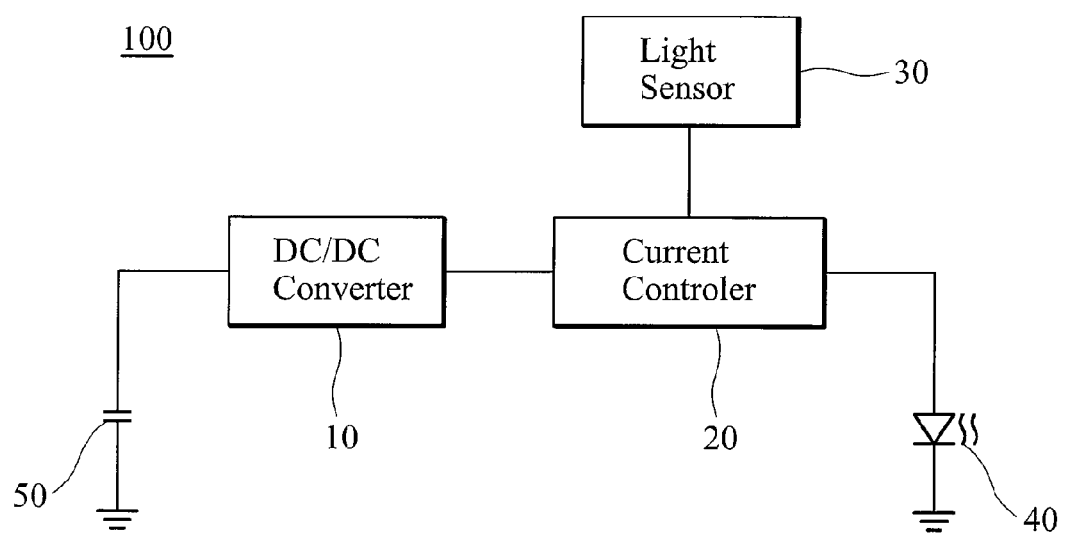
FIG. 1 is a schematic diagram of a conventional panel brightness control circuit.

Table 1 illustrates frequencies of photodiode $D_2$, time periods and voltage values of low output voltage Vout, voltage values of high output voltage Vout and current $I_2$ in different voltage sources and differently environmental brightness according to the first embodiment of the invention. As known in FIG. 1, in the same environmental brightness, when the voltage source is low voltage level, the frequency of photodiode $D_2$ is high, current $I_2$ is large and the time period of low output voltage Vout is longer that photodiode D2 can maintain the same brightness. In addition, in the same voltage source, when the environmental brightness is brighter, the frequency of photodiode D2 is higher and current $I_2$ is stronger to make the photodiode D2 brighter. On the contrary, in the same voltage source, when the environmental brightness is less, the frequency of photodiode $D_2$ is low and current $I_2$ is weaker to avoid the photodiode D2 becoming too bright.

TABLE 1

| Voltage Sources | Environmental Brightness | Frequencies | Periods and voltages (low Vout) | Voltages (high Vout) | $I_2$ |
|---|---|---|---|---|---|
| 3.0 V | 300 lux | 548 Hz | 39 µsec (0.20 V) | 3.0 V | 192 µA |
| 2.5 V | 300 lux | 625 Hz | 63 µsec (0.06 V) | 2.5 V | 200 µA |
| 2.0 V | 300 lux | 695 Hz | 172 µsec (0.10 V) | 2.0 V | 212 µA |
| 3.0 V | about 50 lux | 93 Hz | 36 µsec (0.24 V) | 3.0 V | 20 µA |
| 2.5 V | about 50 lux | 112 Hz | 59 µsec (0.14 V) | 2.5 V | 21 µA |
| 2.0 V | about 50 lux | 137 Hz | 154 µsec (0.02 V) | 2.0 V | 22 µA |

Figure 4:
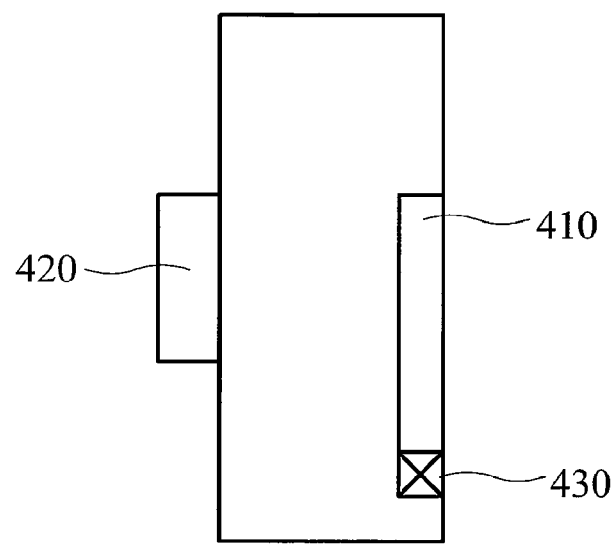
FIG. 4 is a schematic diagram of digital camera with brightness control circuit according to another embodiment of the invention.

FIG. 4 is a schematic diagram of digital camera 400 with brightness control circuit 200 according to another embodiment of the invention. As shown in FIG. 4, sensor 430 is disposed beside display panel 410, unlike conventional disposition at the inside of lens 420. Thus, it can detect actual brightness of display panel and the brightness control circuit can accurately control the brightness of display panel 410. In addition, brightness control circuit 200 can be a portion of a backlight control module, and the backlight control module can be a portion of a digital camera.

While the invention has been described by way of example and in terms of preferred embodiment, it is to be understood that the invention is not limited to thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A brightness control circuit for controlling brightness of a light emitting module, comprising
   a light sensor module generating a first current through the light sensor module according to a light intensity;
   a charging module coupled between the light sensor module and a ground and generating a charging voltage at a voltage node according to the first current;
   a voltage control circuit comprising:
      a reference voltage source providing a reference voltage;
      a comparator having a non-inverse input terminal coupled to the reference voltage source, an inverse input terminal coupled to the voltage node and a first output terminal and outputting a comparative signal according to the reference voltage and the charging voltage; and
      a diode coupled between the inverse input terminal and the first output terminal; and
   a switch coupled to the voltage control circuit and providing a second current through the light emitting module according to the comparative signal.

2. The brightness control circuit as claimed in claim 1, wherein the switch is a bipolar transistor.

3. The brightness control circuit as claimed in claim 1, wherein the comparator is an operational amplifier.

4. The brightness control circuit as claimed in claim 1, wherein the light emitting module comprises a photodiode.

5. The brightness control circuit as claimed in claim 1, wherein the light sensor module is a photoelectric converting element.

6. The brightness control circuit as claimed in claim 1, wherein the light sensor module is adjacent to the light emitting module.

7. The brightness control circuit as claimed in claim 1, wherein the charging module comprises a capacitor.

8. The brightness control circuit as claimed in claim 1, wherein the reference voltage is generated by a voltage divider.

9. The brightness control circuit as claimed in claim 1, wherein the diode comprises a positive terminal coupled to the non-inverse terminal and a negative terminal coupled to the first output terminal.

10. A brightness control circuit for a electronic device with a light emitting module, comprising
    a light sensor module generating a first current through the light sensor module according to a light intensity;
    a charging module coupled between the light sensor module and a ground and generating a charging voltage at a voltage node according to the first current;
    a voltage control circuit comprising:
       a reference voltage source providing a reference voltage;
       an operational amplifier having a non-inverse input terminal coupled to the reference voltage source, an inverse input terminal coupled to the voltage node and a first output terminal and outputting a comparative signal according to the reference voltage and the charging voltage; and
       a diode coupled between the inverse input terminal and the first output terminal; and
    a bipolar transistor coupled to the voltage control circuit and providing a second current according to the comparative signal.

11. The brightness control circuit as claimed in claim 10, wherein the light emitting module further comprises a photodiode.

12. The brightness control circuit as claimed in claim 10, wherein the electronic device is a LCD TV, a PDA, an image capturing device, a cellphone or a handheld game console.

13. The brightness control circuit as claimed in claim 10, wherein the light sensor module is a photoelectric converting element.

14. The brightness control circuit as claimed in claim 10, wherein the light sensor module is adjacent to the light emitting module.

15. The brightness control circuit as claimed in claim 10, wherein the charging module comprises a capacitor.

16. The brightness control circuit as claimed in claim 10, wherein the diode comprises a positive terminal coupled to the non-inverse terminal and a negative terminal coupled to the first output terminal.

17. A backlight control module, comprising:
   a light emitting module; and
   a brightness control circuit, comprising:
      a light sensor module generating a first current through the light sensor module according to a light intensity;
      a charging module coupled between the light sensor module and a ground and generating a charging voltage at a voltage node according to the first current;
      a voltage control circuit, comprising:
         a reference voltage source providing a reference voltage;
         a comparator having a non-inverse input terminal coupled to the reference voltage source, an inverse input terminal coupled to the voltage node and a first output terminal and outputting a comparative signal according to the reference voltage and the charging voltage; and
         a diode coupled between the inverse input terminal and the first output terminal; and
      a switch coupled to the voltage control circuit and providing a second current through a light emitting module according to the comparative signal.

18. The backlight control module as claimed in claim 17, wherein the light emitting module comprises a photodiode.

19. The backlight control module as claimed in claim 18, wherein the light sensor module is a photoelectric converting element.

20. The backlight control module as claimed in claim 17, wherein the light sensor module is adjacent to the light emitting module.

* * * * *